US00RE34702E

United States Patent [19]

Lane et al.

[11] E Patent Number: Re. 34,702

[45] Reissued Date of Patent: Aug. 23, 1994

[54] REINFORCED CERAMIC INVESTMENT CASTING SHELL MOLD AND METHOD OF MAKING SUCH MOLD

[75] Inventors: Jan M. Lane, Hampton; John Corrigan, Tabb, both of Va.; Philip D. Crouch, New Berlin, Wis.

[73] Assignee: Howmet Corporation, Greenwich, Conn.

[21] Appl. No.: 22,307

[22] Filed: Feb. 25, 1993

Related U.S. Patent Documents

Reissue of:

[64] Patent No.: 4,998,581
Issued: Mar. 12, 1991
Appl. No.: 285,412
Filed: Dec. 16, 1988

[51] Int. Cl.[5] ..... B22C 9/04
[52] U.S. Cl. ..... 164/517; 164/361
[58] Field of Search ..... 164/516, 517, 519, 361

[56] References Cited

U.S. PATENT DOCUMENTS

| | | | |
|---|---|---|---|
| 775,205 | 11/1904 | Clifford . | |
| 2,474,186 | 6/1949 | Marks . | |
| 3,032,842 | 5/1962 | House . | |
| 3,343,595 | 7/1967 | Kessler . | |
| 3,409,069 | 11/1968 | Baker . | |
| 3,452,804 | 7/1969 | Mellen, Jr. et al. | 164/516 |
| 3,729,050 | 4/1973 | Carnot et al. . | |
| 3,808,667 | 5/1974 | Evertz et al. . | |
| 4,040,466 | 8/1977 | Horton et al. . | |
| 4,044,815 | 8/1977 | Smashey et al. . | |
| 4,549,599 | 10/1985 | Reiner et al. | 164/361 |

FOREIGN PATENT DOCUMENTS

| | | | |
|---|---|---|---|
| 1026929 | 2/1978 | Canada | 164/361 |
| 55-64945 | 5/1980 | Japan . | |
| 3748 | 1/1983 | Japan | 164/516 |
| 1093895 | 3/1965 | United Kingdom . | |

OTHER PUBLICATIONS

Patent Abstracts of Japan, vol. 5, No. 65 (Feb. 18, 1981) (JP-A-56-17157).

*Primary Examiner*—Kuang Y. Lin
*Attorney, Agent, or Firm*—Finnegan, Henderson, Farabow, Garrett & Dunner

[57] ABSTRACT

A reinforced ceramic investment casting shell mold and method of making such mold. The ceramic investment casting shell mold includes alternate, repeating layers of a ceramic material and a ceramic stucco defining an overall thickness of the shell mold. A fibrous reinforcing material is disposed in the alternate, repeating layers at an intermediate thickness of the shell mold. The fibrous reinforcing material has high tensile strength at elevated temperature and a coefficient of thermal expansion that is less than the coefficient of thermal expansion of the ceramic material and the ceramic stucco. The fibrous reinforcing material is preferably woven into a twisted yarn and disposed in a generally spiral configuration.

17 Claims, 1 Drawing Sheet

REINFORCED CERAMIC INVESTMENT CASTING SHELL MOLD AND METHOD OF MAKING SUCH MOLD

Matter enclosed in heavy brackets [ ] appears in the original patent but forms no part of this reissue specification; matter printed in italics indicates the additions made by reissue.

FIELD OF THE INVENTION

The present invention relates to the investment casting of metals and, more particularly, to a reinforced ceramic investment casting shell mold an a method of making such mold.

BACKGROUND OF THE INVENTION

Ceramic shell molds are used in the investment casting of metals to contain and shape the molten metal. In the casting of larger articles and in the casting of articles at higher casting temperatures, conventional ceramic shell molds are susceptible to bulging and cracking when they are filled with molten metal. When the ceramic shell mold bulges, the dimensions of the resultant casting are not accurate. Significant cracking can result in failure of the ceramic shell mold and runout of the molten metal.

Accordingly, it is an object of the invention to provide an investment casting ceramic shell mold having improved strength sufficient to significantly reduce or eliminate the bulging and cracking problems experienced in conventional ceramic shell molds.

It is a further object of the invention to provide a method of making an investment casting ceramic shell mold having such improved strength.

Additional objects and advantages will be set forth in part in the description which follows, and in part will be obvious from the description, or may be learned by practice of the invention.

SUMMARY OF THE INVENTION

To achieve the foregoing objects and in accordance with the purpose of the invention, as embodied and broadly described herein, the ceramic investment casting shell mold of the present invention includes alternate, repeating layers of a ceramic material and a ceramic stucco defining an overall thickness of the shell mold, and a fibrous reinforcing material disposed in the alternate, repeating layers at an intermediate thickness of the shell mold. The reinforcing material has high tensile strength at elevated temperature and a coefficient of thermal expansion that is less than the coefficient of thermal expansion of the ceramic material and the ceramic stucco.

The fibrous reinforcing material is preferably disposed in the alternate, repeating layers at an intermediate thickness of 6 to 9 of such layers. The preferred fibrous reinforcing material is an alumina-based or mullite-based ceramic composition having a tensile strength of at least 200,000 psi and a coefficient of thermal expansion that is approximately one-half the coefficient of thermal expansion of the ceramic material and the ceramic stucco.

In the method of making a ceramic investment casting shell mold of the present invention, a pattern having the shape of the desired casting is provided. The pattern is dipped into a ceramic slurry to form a coating on the pattern. Ceramic stucco is then applied on the coating.

The steps of dipping the pattern and applying the stucco are repeated to build up the shell mold to an intermediate thickness that is less than the desired overall thickness of the shell mold. The fibrous reinforcing material is disposed around the shell mold at the intermediate thickness, and the shell mold is built up to the desired overall thickness by repeating the dipping step and the applying step over the reinforcing material.

The step of disposing the fibrous reinforcing material around the shell mold preferably further includes wrapping the fibrous reinforcing material around the shell mold in a generally spiral configuration. More preferably, the fibrous reinforcing material is wrapped around the shell mold in a substantially continuous spiral leaving a space between successive wraps of the fibrous reinforcing material around the shell mold. The space is preferably in the range of from about 0.2 to about 2.0 inches.

The accompanying drawing, which is incorporated in and constitutes a part of the specification, illustrates an embodiment of the invention and, together with the description, serves to explain the principles of the invention.

DESCRIPTION OF THE PREFERRED EMBODIMENTS

Figure 1:
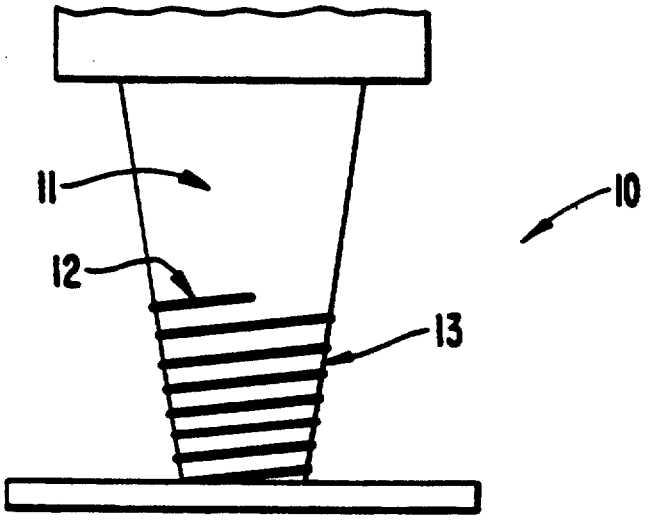
FIG. 1 is a side elevational view of a reinforced ceramic investment casting shell mold made in accordance with the present invention.

Reference will now be made in detail to the presently preferred embodiments of the invention, an example of which is illustrated in the accompanying drawing.

A pattern having the shape of the desired casting is provided. The pattern may be made of wax, plastic, frozen mercury, or other materials suitable for use in "lost wax" casting processes.

In accordance with the invention, a coating is formed on the pattern by dipping the pattern into a ceramic slurry. The initial coating formed on the pattern is generally referred to as the facecoat or facecoat layer. The ceramic slurry may be comprised of silica, alumina, zirconia, or other suitable ceramic material. After allowing excess slurry to drain from the coated pattern, ceramic stucco is applied. The ceramic stucco may be coarse alumina (120 mesh or coarser) or other suitable refractory material. The coated and stuccoed pattern is allowed to dry prior to the application of additional layers.

In accordance with the invention, the dipping step and the applying step are repeated over the facecoat layer to build up the shell mold to an intermediate thickness that is less than the desired overall thickness of the shell mold. The intermediate thickness may be varied depending on the desired overall thickness of the shell mold. Preferably, the shell mold is built up to the intermediate thickness by repeating the dipping step and the applying step 6 to 9 times. At this degree of shell build up, any sharp edges and corners of the pattern are rounded.

In accordance with the invention, a fibrous reinforcing material is disposed around the intermediate shell mold. The fibrous reinforcing material has high tensile strength at elevated temperature and a coefficient of thermal expansion that is less than the coefficient of thermal expansion of the ceramic materials comprising the ceramic slurry and the ceramic stucco. In connection with the discription of the invention, the term "fibrous" denotes that the reinforcing material has an elongated aspect ratio. It is preferred that the fibrous reinforcing material has a length sufficient to allow it to be disposed around the intermediate shell mold in a continuous manner. Most preferably, the fibrous reinforcing material is a continuous length of material wound around the shell mold.

The preferred fibrous reinforcing material is an alumina-based or mullite-based ceramic composition having a tensile strength of at least 200,000 psi and a coefficient of thermal expansion (at temperatures up to 1700° F.) that is approximately one-half the coefficient of thermal expansion (at temperatures up to 1700° F.) of the ceramic materials comprising the ceramic slurry and the ceramic stucco. Fibrous materials of this description are commercially available. NEXTEL 440 fiber manufactured by the 3M Company is the preferred reinforcing material.

In a preferred embodiment, the fibrous reinforcing material is a woven twisted yarn. It has been found that a twisted yarn formed by first weaving a three roving string and then weaving four strings into the twisted yarn is particularly advantageous in terms of convenience of handling. Alternatively, the fibrous reinforcing material may be formed into a woven tape product. The preferred width for the woven tape product is about 0.10 inch to about 1.0 inch.

The fibrous reinforcing material is disposed around the shell mold with sufficient tension so that it remains fixed during subsequent handling required to build up the shell mold to its overall thickness. If desired, ceramic adhesive or dip coat liquid may be used to locally fasten the fibrous reinforcing material to the shell mold for convenience of handling. In this case, the shell mold is dried before the application of additional layers.

The step of disposing the fibrous reinforcing material around the intermediate shell mold preferably further includes wrapping the fibrous reinforcing material around the intermediate shell mold in a generally spiral configuration. More preferably, the fibrous reinforcing material is wrapped around the intermediate shell mold in a substantially continuous spiral leaving a space between successive wraps of the fibrous reinforcing material around the intermediate shell mold. The space between successive wraps of the fibrous reinforcing material is selected to allow for adequate shell build up around the reinforcing material to structurally affix the reinforcing material to the shell mold. It has been found that a space in the range of from about 0.2 inch to about 2.0 inches is sufficient for this purpose.

After the fibrous reinforcing material is in place and the intermediate shell mold is dried, if necessary, the shell mold is built up to the desired overall thickness by repeating the dipping step and the applying step over the fibrous reinforcing material.

The principles of the invention may be used to reinforce virtually any ceramic investment casting shell mold. By way of example, a ceramic shell mold for investment casting a large turbine airfoil reinforced in accordance with the invention is shown generally as 10 in FIG. 1. Fibrous reinforcing material 12 is wrapped around shell mold 11 at an intermediate thickness in a continuous spiral leaving space 13 between successive wraps of reinforcing material 12 around mold 11.

As mentioned above, the fibrous reinforcing material has a coefficient of thermal expansion that is lower than the ceramic materials comprising the ceramic slurry and the ceramic stucco. Consequently, at all temperatures above the drying temperature for the mold, The fibrous reinforcing material imparts a compressive load on the portion of the shell mold over which it is disposed. This compressive load serves to increase the green strength, fired strength, and hot strength of the shell mold. In addition, if any cracking occurs when the shell mold is filled with molten metal, the fibrous reinforcing material holds the crack closed to prevent metal runout.

The benefits of the compressive loading imparted by the fibrous reinforcing material may be enhanced by weaving twisted yarn into an open net-like member. Such an arrangement imparts compressive loading in multiple directions and can be used as a wrap in the manner described above, or as a local overlay.

The principles of the present invention described broadly above will now be described with reference to specific examples.

EXAMPLE 1

A ceramic shell mold having a width of 10 inches and a height of 18 inches used to cast a large airfoil of the type shown in FIG. 1 was reinforced in accordance with the invention. A pattern having the shape of the airfoil was dipped into a slurry of silica and zirconia and then alumina stucco was applied. These steps were repeated 9 times to build up the shell mold to approximately one-half of its overall thickness. The shell mold was then wrapped with NEXTEL 440 mullite fiber (available from the 3M Company) that had been wound into a 12 roving yarn. Starting from the base of the mold and moving upwards, the yarn was wrapped around the mold in a continuous spiral with a space of approximately 0.25 inch between successive wraps of the yarn around the mold. The wrapping of the yarn around the mold was discontinued at the portion of the mold corresponding to the shank portion of the airfoil. The shell build up was completed by repeatedly dipping the shell mold in the slurry of silica and zirconia and applying alumina stucco. The shell mold then was subjected to conventional wax removal, firing, and casting preparation treatments. Molten metal was cast in the shell mold and it successfully held the metal.

EXAMPLE 2

A ceramic shell mold having a diameter of 36 inches and a height of 15 inches used to cast a large structural component was reinforced in accordance with the invention. A pattern having the shape of the structural component was dipped into a slurry of silica and zirconia and then zircon stucco was applied. These steps were repeated 6 times to build up the shell mold to approximately two-thirds of its overall thickness. The shell mold was then wrapped with the yarn described above in example 1 in a continuous spiral from the base of the mold up to the top leaving a space of approximately 2.0 inches between successive wraps of the yarn around the mold. The shell build up was then completed by repeatedly dipping the shell mold in the slurry of silica and zirconia and applying the zircon stucco. The shell mold then was subjected to conventional wax removal, firing, and casting preparation treatments. The shell mold was crack-free after wax removal due to the compressive load imparted by the yarn during wax expansion. The reinforced shell mold successfully held molten metal during casting, even at high mold preheat temperatures.

The present invention has been disclosed in terms of preferred embodiments. The invention is not limited thereto and is defined by the appended claims and their equivalents.

What is claimed is:

1. A method of making a ceramic investment casting shell mold, said method comprising the steps of:

providing a pattern having the shape of the desired casting;

dipping said pattern into a ceramic slurry to form a coating on said pattern;

applying a ceramic stucco on said coating;

repeating said dipping step and said applying step to build up said shell mold to an intermediate thickness, said intermediate thickness being less than the desired overall thickness of said shell mold;

[disposing] *winding* a *substantially continuous* fibrous reinforcing material around said shell mold;

building up said shell mold to the desired overall thickness by repeating said dipping step and said applying step over said reinforcing material; and firing said shell mold, said fibrous reinforcing material having high tensile strength at elevated temperature such that said reinforcing material remains an integral part of said shell mold after firing and said fibrous reinforcing material having a coefficient of thermal expansion that is less than the coefficient of thermal expansion of the ceramic materials comprising said ceramic slurry and said ceramic stucco.

2. The method of claim 1, wherein said step of [disposing] *winding* a fibrous reinforcing material around said shell mold is performed after said dipping step and said applying step having been alternately repeated approximately 6 to 9 times.

3. The method of claim 1, wherein said reinforcing material is an alumina-based or mullite-based ceramic composition having a tensile strength of at least 200,000 psi and a coefficient of thermal expansion that is approximately one-half the coefficient of thermal expansion of the ceramic materials comprising said ceramic slurry and said ceramic stucco.

4. The method of claim 1, wherein said step of [disposing] *winding* said reinforcing material around said shell mold further comprises:

Wrapping said reinforcing material around said shell mold in a generally spiral configuration.

5. The method of claim 4, wherein said reinforcing material is [wrapped] *wound* around said shell mold in a substantially continuous spiral leaving a space between successive [wraps] *windings* of said reinforcing material around said shell mold.

6. The method of claim 5, wherein said space is in the range of from about 0.2 inch to about 2.0 inches.

7. The method of claim 1, wherein said reinforcing material is a woven twisted yarn.

8. The method of claim 1, wherein said reinforcing material is a woven tape product.

9. The method of claim 7, wherein said yarn reinforcing material is an open net-like member.

10. A ceramic investment casting shell mold, said shell mold comprising:

alternate, repeating layers of a ceramic material and a ceramic stucco defining an overall thickness of said shell mold; and a *substantially continuous* fibrous reinforcing material [disposed] *wound around said shell mold* in said alternate, repeating layers at an intermediate thickness of said shell mold, said reinforcing material being comprised of an alumina-based or mullite-based ceramic composition having high tensile strength of at least 200,000 psi and having a coefficient of thermal expansion that is approximately one-half the coefficient of thermal expansion of said ceramic material and said ceramic stucco.

11. The ceramic investment casting shell mold of claim 10, wherein said reinforcing material is [disposed] *wound* in said alternate, repeating layers at an intermediate thickness of 6 to 9 alternate, repeating layers.

12. The ceramic investment casting shell mold of claim 10, wherein said reinforcing material is wound in a generally spiral configuration.

13. The ceramic investment casting shell mold of claim 12, wherein said reinforcing material is [disposed] *wound* in said shell mold in substantially continuous spiral leaving a space between successive wraps of said reinforcing material.

14. The ceramic investment casting shell mold of claim 13, wherein said space is in the range of from about 0.2 inch to about 2.0 inches.

15. The ceramic investment casting shell mold of claim 10, wherein said reinforcing material is a woven twisted yarn.

16. The ceramic investment casting shell mold of claim 10, wherein said reinforcing material is a woven tape product.

17. The ceramic investment casting shell mold of claim 15, wherein said yarn reinforcing material is woven into an open net-like member.

* * * * *

UNITED STATES PATENT AND TRADEMARK OFFICE

CERTIFICATE OF CORRECTION

PATENT NO. : Re. 34,702

DATED : August 23, 1994

INVENTOR(S) : Jan M. Lane, John Corrigan, Phillip D. Crouch

It is certified that error appears in the above-indentified patent and that said Letters Patent is hereby corrected as shown below:

Claim 4, col. 5, line 47, "Wrapping" should read --wrapping--

Signed and Sealed this

Twentieth Day of December, 1994

*Attest:*

Bruce Lehman

BRUCE LEHMAN

*Attesting Officer*

*Commissioner of Patents and Trademarks*